United States Patent [19]
Van de Pol et al.

[11] Patent Number: 5,983,365
[45] Date of Patent: Nov. 9, 1999

[54] FRAME PROCESSING UNIT WITH TEST MODE, LINE TERMINATION MODULE INCLUDING SUCH A FRAME PROCESSING UNIT, AND METHOD FOR TESTING SUCH A FRAME PROCESSING UNIT

[75] Inventors: Daniel Frans Jozefina Van de Pol, Brasschaat; Erik Moerman, Bottelare; Johan David, Leuven, all of Belgium; Johannes Anthonius Maria Van Tetering, Zevenbergen, Netherlands

[73] Assignee: Alcatel N.V., Netherlands

[21] Appl. No.: 08/601,729

[22] Filed: Feb. 15, 1996

[30] Foreign Application Priority Data

Feb. 20, 1995 [EP] European Pat. Off. ............. 95200398

[51] Int. Cl.⁶ .................................................. G06F 11/00
[52] U.S. Cl. ........................... 714/31; 714/712; 370/509; 370/510; 370/512
[58] Field of Search ................. 395/183.07; 371/20.1, 371/27, 42; 370/506, 509, 510, 512, 218; 714/31, 712, 738, 789

[56] References Cited

U.S. PATENT DOCUMENTS

| | | | |
|---|---|---|---|
| 5,251,204 | 10/1993 | Izawa et al. | 370/209 |
| 5,331,630 | 7/1994 | Fujita et al. | 370/351 |
| 5,383,196 | 1/1995 | Morton | 371/27 |
| 5,414,707 | 5/1995 | Johnston et al. | 370/395 |
| 5,430,659 | 7/1995 | Miller | 364/484 |
| 5,455,832 | 10/1995 | Bowmaster | 371/20.1 |
| 5,572,515 | 11/1996 | Williamson et al. | 370/252 |

FOREIGN PATENT DOCUMENTS

| | | | |
|---|---|---|---|
| 62-230244 | 10/1987 | Japan | H04L 11/00 |
| 62-231544 | 10/1987 | Japan | H04L 11/00 |
| 9413073 | 6/1994 | WIPO | H04J 3/14 |

OTHER PUBLICATIONS

Toshiharu Sugawara; Method for Automatic Detection of 2 Typical Problems in TCP/IP–based Internetworking; Journal; vol. 91, No. 17 (DPS–49), 1991.
Robe et al; A Sonet STS–3C User Network Interface Integrated Circuit; IEEE Journal, vol. 9, No. 5; Jun. 1991, pp. 732–740.
Cariolaro et al; Signal Theory for SONET STM–1; SBT/IEEE Conference; Sep. 3–6, 1990; pp. 26–32.
Sholanoler et al; Methodology & Results of Synchronous Digital Hierarchy Network Payload Jitter Simulation; Simulation V.64. No. 1 Jan. 1995; pp. 34–41.
Nakajima; SONET: Progess Report from Japan; Telecommunications; V24; N8; Aug. 1990; pp. 58–61.
"A Broadband ISDN line termination chip set for 1.2 Gbit/s" by Meylemans, et al. published in 1993 int he USA by IEEE. pp. 1–5, with Figures.
CCITT Recommendation G. 709, published in 1991, "Synchronous Multiplexing Structure", pp. 1–31. –General Aspects of Digital Transmission Systems: Terminal Equipments.

Primary Examiner—Dieu-Minh T. Le
Attorney, Agent, or Firm—Ware, Fressola, Van Der Sluys & Adolphson LLP

[57] ABSTRACT

To test the processing of a data frame processing unit (FPU) which, in a normal working mode, processes input data frames applied to a data frame input (FI) thereof, the data frame processing unit (FPU) is brought in a test mode. Therefore, an active test signal is applied to a test mode control input (TCI) of this data frame processing unit (FPU). When brought in the test mode, the frame counters of the data frame processing unit (FPU) have lower limits and test data frames with smaller dimensions than the input data frames applied to the data frame input (FI).

5 Claims, 2 Drawing Sheets ns,5,983,365

FRAME PROCESSING UNIT WITH TEST MODE, LINE TERMINATION MODULE INCLUDING SUCH A FRAME PROCESSING UNIT, AND METHOD FOR TESTING SUCH A FRAME PROCESSING UNIT

TECHNICAL FIELD

The present invention relates to a data frame processing unit, to a line termination module including such a data frame processing unit and to a method for testing such a data frame processing unit.

BACKGROUND OF THE INVENTION

Such a data frame processing unit and such a line termination module are already known in the art, e.g. from the article 'A broadband ISDN line termination chip set for 1.2 Gbit/s', written by P. Meylemans, L. Cloetens, K. Adriaensen and D. Sallaerts and published in 1993 in the USA by IEEE. Therein, a set of line termination chips performing external transmission termination functions, external transfer mode termination functions, conversion between external transfer mode and internal transfer mode, and switch fabric termination functions is described. These chips are in fact line termination modules including data frame processing units.

Standardized data frames, processed by such a data frame processing unit however are often very lengthy. STM-1 frames for example, as described in the CCITT Recommendation G.709, published in 1991, have a total length of 2430 bytes. Processing such data frames is very time consuming and consequently test simulations, for testing the functionality of individual samples of the above mentioned line termination chips, require time periods to the extent of several hours. Solutions to speed up the testing of a data frame processing unit or a line termination module are usually searched in the use of faster computers controlling this module or unit, but such computers are very expensive.

SUMMARY OF THE INVENTION

An object of the present invention is to provide a data frame processing unit of the above known type but which can be tested in a fast way without using expensive computers.

According to the invention, this object is achieved by means of the data frame processing unit adapted to process, in a normal working mode, input data frames applied thereto via a data frame input thereof, characterized in that said data frame processing unit processes, in a test mode, test data frames containing a predetermined part of said input data frames and needed for testing purposes, said test data frames being applied to said data frame processing unit via said data frame input and said data frame processing unit being brought in said test mode by applying an active test signal to a test mode control input thereof.

Another object of the invention is line termination module of a telecommunication system, said line termination module including at least one data frame processing unit adapted to process, in a normal working mode, input data frames applied thereto via a data frame input thereof, characterized in that said data frame processing unit processes, in a test mode, test data frames containing a predetermined part of said input data frames and needed for testing purposes, said test data frames being applied to said data frame processing unit via said data frame input and said data frame processing unit being brought in said test mode by applying an active test signal to a test mode control input thereof.

A further object of the invention is a test method for a data frame processing unit which processes, in its normal working mode, input data frames applied to a data frame input thereof, characterized in that for testing purposes said data frame processing unit is first brought in a test mode by applying an active test signal to a test mode control input thereof, then test data frames containing a predetermined part of said input data frames are applied to said data frame input, and finally said test data frames are processed by said data frame processing unit.

By means of the present invention, the data frame processing unit can be brought in a test mode wherein test data frames can be processed much faster than the input data frames 10 processed in the normal working mode, since in test mode only part of the input data frames is handled.

However, a condition to enable the above fast testing of the data frame processing unit by applying test data frames to an input thereof, is that this data frame processing unit processes, in the normal working mode, only a part of the data organised in the input data frames. Indeed, a data frame processing unit which processes, in the normal working mode, e.g. only overhead data whilst the input data frames applied to an input of this data frame processing unit contain user data as well as overhead data, might be tested by applying to this input, test data frames which contain only the overhead sections of the input data frames. The length of test data frames containing only a predetermined part of the input data frames is restricted with respect to the length of the input data frames and consequently they are processed faster by the data frame processing unit.

When going from the normal working mode to the test mode, the functionality of the data frame processing unit may not be restricted, otherwise part of the functions performed by the data frame processing unit would not be tested. Nevertheless, the data frame processing unit should be told that test data frames which are smaller than the input data frames will be applied to an input thereof. This is achieved by applying an active test signal to a test mode control input of the data frame processing unit. Therefore the data frame processing unit thus is equipped with such an additional control input and logic enabling to bring this data frame processing unit in the test mode. Once the data frame processing unit is tested and brought back into its normal working mode, the test mode control input and test mode itself are not used.

An additional feature of the present invention is that it is applicable in the field of synchronous digital hierarchy (SDH).

Another additional feature of the data frame processing unit according to the present invention is that it can solve the problem of adapting the data frame processing unit to be able to process, in the test mode, test data frames with dimensions different from the dimensions of the input data frames.

Indeed, as already mentioned, the data frame processing unit, once it is brought in the test mode, should be told that test data frames with other dimensions will be applied to an input thereof. Therefore the internal frame length of the data frame processing unit should be changed which in one embodiment of the invention is done by adapting the frame counter limits of the data frame processing unit.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
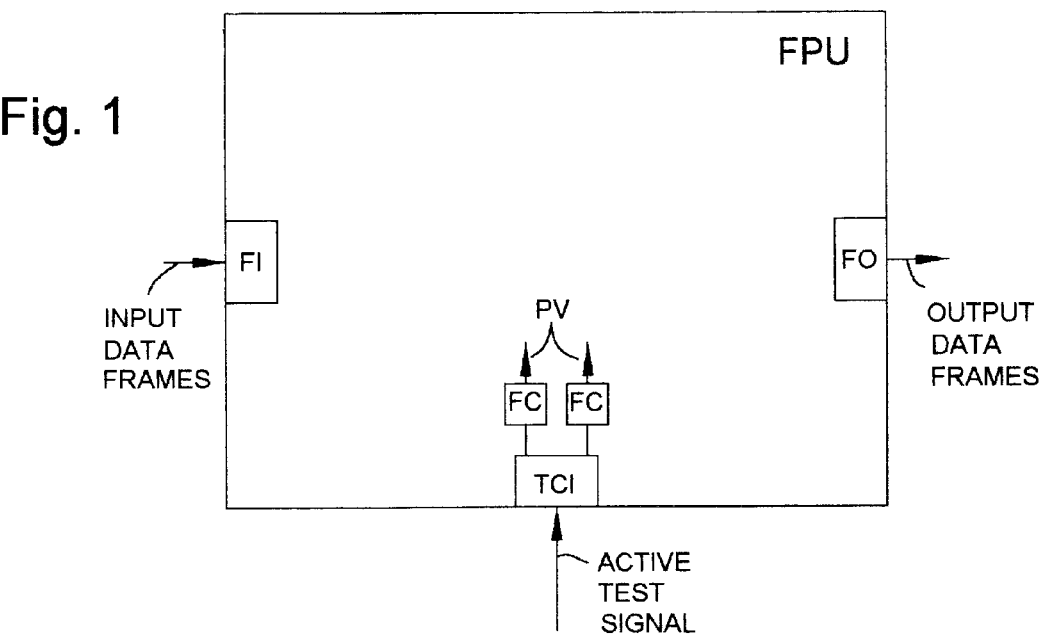
FIG. 1 is a schematic representation of an embodiment of a data frame processing unit FPU according to the present invention.

Referring to FIG. 1, an embodiment of a data frame processing unit FPU according to the present invention will be described.

This embodiment is provided with a data frame input FI, a data frame output FO and a test mode control input TCI, and further includes two frame counters (FC), generating pointer values PV to horizontal and vertical positions in frames applied to the data frame input FI.

In a normal working mode, this data frame processing unit FPU processes standardized input data frames, e.g. STM-n frames as described in *CCITT Recommendation G. 709*, published in 1991. Such an STM-n frame contains user data as well as overhead data, both ordered to constitute a frame structure with n×270 columns and 9 rows. The smallest STM-n frame, which is obviously an STM-1 frame, thus already contains 270×9=2430 bytes. The columns with index 1 to 9 in such an STM-1 frame carry section overhead data (SOH), whilst the remaining 261 columns constitute a so called virtual container (VC). The fourth row of the section overhead data (SOH) is determined to contain a pointer value referring to the beginning position in the virtual container (VC). Starting from this beginning position, the first column is reserved to carry path overhead data (POH). The last 260 columns of the virtual container (VC) are filled with payload data (PL), which are user data.

The embodiment of the data frame processing unit FPU of FIG. 1 processes, in the normal working mode, only overhead data, i.e. the section overhead data (SOH), the path overhead data (POH), and the first and second column filled with payload data (PL). These data are found in 12 columns of the 270 columns which form part of the STM-1 frames. The payload data (PL) are transferred transparently by the data frame processing unit FPU from the data frame input FI to the data frame output FO.

Before being used, the functionality of each sample of the data frame processing unit FPU should be tested. Due to the length of the predefined STM-1 frames however, testing the functionality requires time periods to the extent of several hours for each individual sample of the data frame processing unit FPU. Nevertheless, most of this test time is wasted to transfer user data transparently from the data frame input FI to the data frame output FO. Therefore, by applying an active test signal to the test mode control input TCI, the data frame processing unit FPU is brought into a test mode wherein the complete functionality of the unit FPU is tested much faster.

Indeed, from the moment an active test signal is applied to the test mode control input TCI, the frame counter limits of the above mentioned frame counters are reduced. As a result, the two frame counters are only enabled to generate pointer values to positions in frames which are smaller than the input data frames. The internal frame length of the data frame processing unit FPU is thus restricted.

Furthermore, if the unit FPU is brought in the test mode, test data frames whose dimensions match the new frame counter limits are applied to the data frame input FI. To contain only overhead data, the horizontal frame counter limit is reduced from 270 to 12, whilst the vertical frame counter limit remains 9. Consequently, the test data frames include 12 columns and 9 rows and their length equals 9×12=108 bytes, which implies a reduction of the frame length by a factor 22 when compared to the STM-1 input data frames which, as already mentioned, contain 2430 bytes.

Such test data frames, having smaller dimensions, are generated by adapting for example software programs controlling data frame generating means.

It is noted that for STM-n input data frames, all values in the given example are multiplied by a factor n, values 4, 16 and 64 being currently defined values for the factor n in the above cited CCITT standard. As a result, test simulations for units FPU processing STM-16 or STM-64 frames become executable within an acceptable time period.

Summarizing, the data frame processing unit FPU shown in FIG. 1 speeds up the test procedure by a factor of 22 compared to the known data frame processing units, as for example described in the article '*A broadband ISDN line termination chip set for 1.2 Gbit/s*', from the authors P. Meylemans, L. Cloetens, K. Adriaensen and D. Sallaerts, published in 1993 in the USA and presented there, in San Francisco, on the ISSCC '93 Conference '*Proceedings if the IEEE International Solid State Circuits*'.

Figure 2:
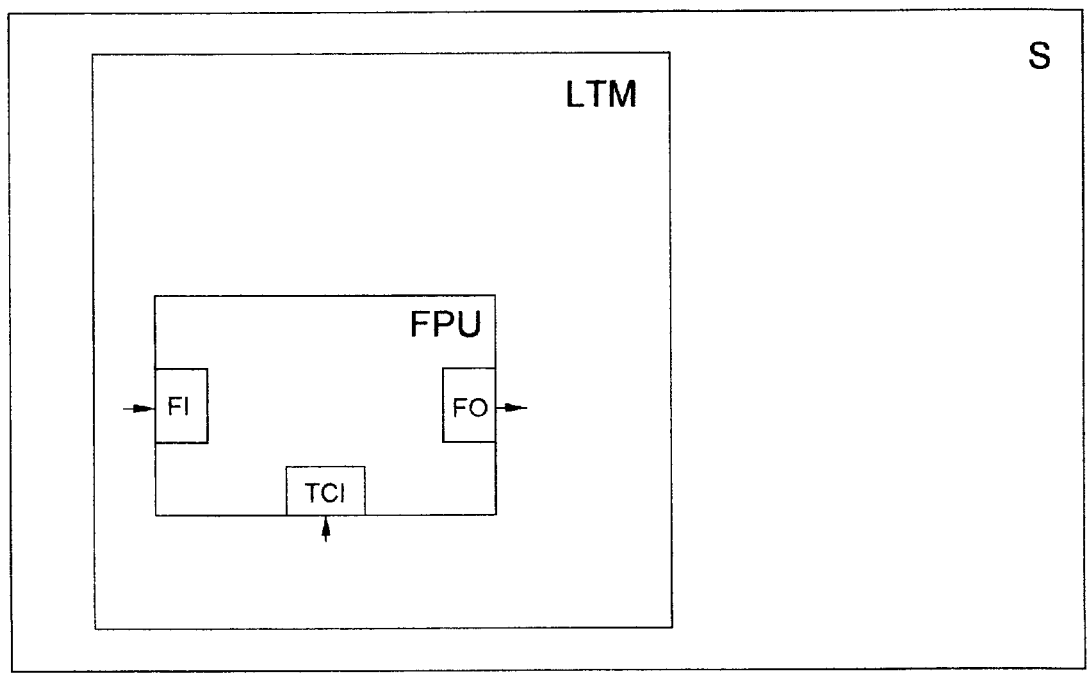
FIG. 2 is a schematic representation of an embodiment of a line termination module LTM according to the resent invention.

In FIG. 2, a line termination module LTM of a telecommunication system S, including a data frame processing unit FPU as described above is shown. Such a line termination module LTM might for example be an interface module between a subscriber and a switch fabric in a synchronous digital hierarchy (SDH) network or any line termination chip described in the above article '*A broadband ISDN line termination chip set for 1.2 Gbit/s*'.

Figure 3:
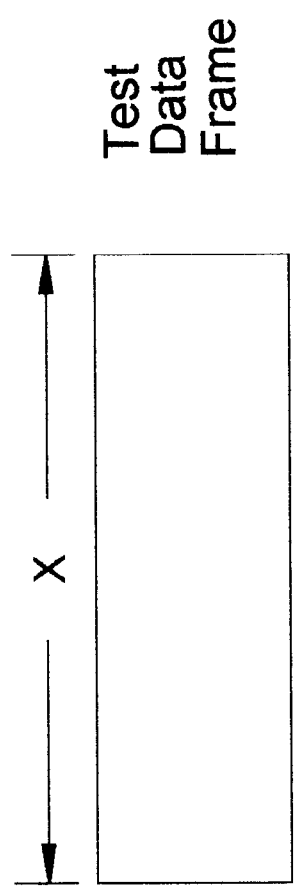
FIG. 3 shows a test data frame having a size X and a standard data frame having a size X+Y.
Figure 3:
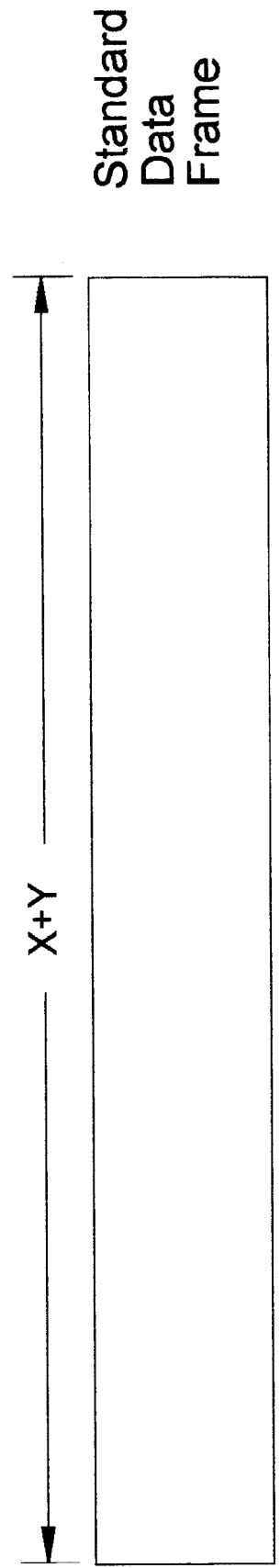

FIG. 3 shows a test data frame having a size X, and also shows a standard data frame having a size X+Y. The standard data frame is a first size, and the test data frame is a second size, smaller than the first size.

It is to be noted that the technique of using test data frames and bringing the data frame processing unit FPU into a test mode can be used in any synchronous digital hierarchy (SDH) application wherein the data frame processing unit FPU processes, in the normal working mode, only a part of the data organised in the input data frames. In the above description, the STM-1 frames thus may be replaced by any kind of frame used in such applications. Obviously, the data frame processing unit FPU, in the normal working mode, might process overhead data only, as in the above described embodiment, user data only, or a combination of both.

While the principles of the invention have been described above in connection with specific apparatus, it is to be clearly understood that this description is made only by way of example and not as a limitation on the scope of the invention.

What is claimed is:

1. A data frame processing unit (FPU) having a test mode control input (TCI) and a data frame input (FI), and adapted to process, when operating in a normal working mode, input data frames having a first size, the input data frames applied to the frame processing unit (FPU) via the data frame input (FI) thereof, characterized in that said data frame processing unit (FPU) is adapted to process when operating in a test mode, test data frames having a second size which is smaller than said input data frames of said first size, said test data frames being distinct from the input data frames and containing a predetermined part similar to one of the parts of said input data frames needed for testing the data frame processing unit (FPU), the test data frames also being applied to said data frame processing unit (FPU) via said data frame input (FI) and said data frame processing unit (FPU) being brought into said test mode from the normal working mode by applying an active test signal to the test mode control input (TCI) thereof so that when the data frame processing unit (FPU) is in the test mode, the data on the data frame input (FI) is interpreted as a test frame and when the data frame processing unit (FPU) is in the normal working mode, the data on the data frame input (FI) is interpreted as an input data frame.

2. A data frame processing unit (FPU) according to claim 1, characterized in that said input data frames are dedicated to synchronous digital hierarchy (SDH) applications.

3. A data frame processing unit (FPU) according to claim 1, characterized in that said data frame processing unit (FPU) includes frame counters generating pointer values pointing to data elements in a said frame, frame counter limits of said frame counters being adaptable according to the status of said test signal.

4. A line termination module (LTM) of a telecommunication system (S), said line termination module (LTM) including at least one data frame processing unit (FPU) adapted to process, in a normal working mode, input data frames applied thereto via a data frame input (FI) thereof, characterized in that said data frame processing unit (FPU) processes, in a test mode, test data frames containing a predetermined part of said input data frames and needed for testing the data frame processing unit (FPU), said test data frames being applied to said data frame processing unit (FPU) via said data frame input (FI) and said data frame processing unit (FPU) being brought in said test mode by applying an active test signal to a test mode control input (TCI) thereof.

5. A method for testing a data frame processing unit (FPU) which processes, in its normal working mode, input data frames of a first size applied to a data frame input (FI) of said FPU, comprising the steps of:

applying an active test signal to a test mode control input (TCI) of said FPU to bring said FPU into a test mode;

applying test data frames of a second size smaller than said input data frames of said first size, said test data frames containing a predetermined part of said input data frames of said first size to said FI; and processing said test data frames by said FPU in order to test the data frame processing unit (FPU).

* * * * *

UNITED STATES PATENT AND TRADEMARK OFFICE
CERTIFICATE OF CORRECTION

PATENT NO. : 5,983,365
DATED     : November 9, 1999
INVENTOR(S) : Van de Pol et al.

It is certified that error appears in the above-identified patent and that said Letters Patent is hereby corrected as shown below:

On the title page, item [56] under

"Foreign Documents" should include 2 foreign documents listed on Examiner's Notice of References Cited, namely:

```
422 914 A2    04/91      EP.....H04L 5/16
03 268533     11/91      Japan..H04L 12/26
```

Signed and Sealed this

Twentieth Day of June, 2000

Attest:

Attesting Officer

Q. TODD DICKINSON

Director of Patents and Trademarks